United States Patent [19]
Klein

[11] Patent Number: 6,038,672
[45] Date of Patent: Mar. 14, 2000

[54] PORTABLE COMPUTER WITH LOW POWER CD-PLAYER MODE

[75] Inventor: Dean A. Klein, Eagle, Id.

[73] Assignee: Micron Electronics, Inc., Nampa, Id.

[21] Appl. No.: 09/006,090

[22] Filed: Jan. 13, 1998

[51] Int. Cl.[7] .................................................. G06F 1/00
[52] U.S. Cl. ........................ 713/322; 713/323; 713/324
[58] Field of Search .................................. 713/1, 2, 100,
713/300, 310, 320, 321, 322, 323, 324,
330, 340

[56] References Cited

U.S. PATENT DOCUMENTS

| | | | |
|---|---|---|---|
| 5,560,024 | 9/1996 | Harper et al. | 395/750 |
| 5,579,524 | 11/1996 | Kikinis | 395/750 |
| 5,603,040 | 2/1997 | Frager et al. | 395/750 |
| 5,617,571 | 4/1997 | Tanaka | 395/750 |
| 5,630,144 | 5/1997 | Woog et al. | 395/750 |
| 5,632,037 | 5/1997 | Maher et al. | 395/750 |
| 5,752,050 | 5/1998 | Hernandez et al. | 395/750.07 |
| 5,838,983 | 11/1998 | Atkinson | 395/750.06 |
| 5,894,579 | 4/1999 | Fujihara | 395/750.06 |

*Primary Examiner*—Ayaz R. Sheikh
*Assistant Examiner*—Tim Vo
*Attorney, Agent, or Firm*—Dorsey & Whitney LLP

[57] ABSTRACT

A power-conserving computer containing a peripheral device that, when used alone, requires the CPU of the computer to be powered-on for only the short period of time needed for the CPU to translate a user-specified command into a command that the CPU then transmits to the peripheral device. Inputs are added to the computer system for direct input of user commands to the peripheral device. The BIOS power-up/reset routine of the computer is modified to detect power-on as a result of user input to the added inputs, to then transmit a corresponding command to the peripheral device, and to finally power down the CPU. The system controller of the computer is electrically shielded from the peripheral device when the system controller is powered-down and the peripheral device is operating.

25 Claims, 3 Drawing Sheets

PORTABLE COMPUTER WITH LOW POWER CD-PLAYER MODE

TECHNICAL FIELD

The present invention relates to the control of peripheral devices in a computer system, and, in particular, the control of peripheral devices in power-conserving computer systems in which the central processing unit and other electronic components are powered down when the electronic components are not needed.

BACKGROUND OF THE INVENTION

Advances in miniaturization of integrated circuits have led to the remarkable miniaturization of computer systems. Room-sized mainframe computers of the 1950s gave way to large, cabinet-sized mainframe and mini-computers of the 1960s and 1970s. The personal computers that emerged during the 1980s today provide, in a desk-top system, greater computing capacity than large mainframe or mini-computers from preceding decades. In the 1990s, personal computers have been further miniaturized to produce portable, convenient laptop computers powered by batteries. High-end laptop computers currently approach the performance of high-end desktop systems. The increase of battery capacity through technological innovation has not, however, kept pace with the increase in the density of integrated circuits and concomitant miniaturization of computer systems. Although newer active matrix display screens and low-resistance pin connection technologies have helped to lower the power consumption of laptop computers, and thereby extend the length of time during which a laptop computer can operate using the available battery capacity, the usefulness of laptop computers is limited by limitations in battery capacity.

Manufacturers have adopted a variety of strategies for conserving the use of electrical energy stored in the batteries of laptop computers. Newer laptop computers employ power management strategies in which unused components are detected and automatically powered down or suspended until they are again required for operation of the computer. For example, the display screen of modern laptop computers is automatically powered down after a period of quiescence. Similarly, the central processing unit ("CPU") of a modern laptop computer is powered down, or suspended, when the computer has not executed any application programs or processed any input or output activities for some period of time.

As with desktop personal computers, laptop computers are being used with increasing frequency not only for executing application programs, but also as a platform for viewing and listening to multimedia presentations and entertainment programs. The CD-ROM drive included with most laptop computers and desktop computers can be used, for example, to playback recorded music CDs through loud speakers attached to the laptop or desktop computer. Playback of recorded music CDs (audio CDs) is commonly implemented through software application programs executed by the CPU. In many current systems, the CPU remains in a powered-on state while the CD-ROM drive is being used for playback of an audio CD. Because the CPU consumes power at a high rate, use of a laptop computer for playback of recorded music CDs is quite limited by battery capacity. A large portion of the power consumed during playback of recorded music in these computer systems is dissipated as heat from the CPU performing largely unused instructions cycles. A need has therefore been recognized by manufacturers of laptop computers to more effectively manage power consumption during playback of an audio CD on a laptop computer when the CPU of the laptop computer is otherwise not being used to either execute application programs or to control the CD-ROM drive.

SUMMARY OF THE INVENTION

One embodiment of the present invention provides electro-mechanical switches that allow a user to control operation of a peripheral device attached to a power-conserving computer system. The CPU of the power-conserving computer system is powered-on, as necessary, to translate user input through the electro-mechanical switches into commands that the CPU then transmits to the peripheral device. When the CPU and other electronic components of the power-conserving computer system are no longer required for operation of the peripheral device, the CPU and other electronic components are powered down, or suspended, by the power management component of the power-conserving computer system while the peripheral device continues to perform the commands transmitted to it. Circuitry is included within the power-conserving computer system to isolate powered down electronic components from the peripheral device during operation of the peripheral device.

DETAILED DESCRIPTION OF THE INVENTION

The present invention provides a user of a power-conserving computer system with the ability to directly operate a peripheral device attached to the power-conserving computer system. In the embodiment discussed below, a user of a power-conserving laptop computer is provided with the ability to directly control the playback of audio CDs by the CD-ROM drive included in the laptop computer. The technique of the present invention can be applied in other types of power-conserving computer systems for operation of a number of different types of peripheral devices.

One strategy for conserving power in a computer system is to power down or suspend the CPU and other electronic components of the computer system when it can be determined that the electronic components are not currently needed by a user. In the embodiment described below, a user operates the CD-ROM drive in order to play audio CDs by inputting various playback commands through electro-mechanical push-button switches connected to the power management micro-controller within the laptop computer. The power management micro-controller then transmits the playback commands to the core logic and CPU via an SM bus. When the CPU is powered-on for execution of other tasks, the CPU can respond to user playback commands entered via the push-button switches by directing corresponding commands to the CD-ROM drive. When the CPU is in a powered-down, or suspended state, the power management micro-controller powers up the CPU which then begins executing a basic input/output system (BIOS) power-up routine. The power-up routine detects when the power-up was initiated because of user input to the push-button switches that control playback of audio CDs by the CD-ROM drive, determines which playback command was input by the user, and accordingly forwards one or more appropriate commands to the CD-ROM drive to initiate the playback operation desired by the user. The power-up routine then issues a Power-CPU-Down command to the micro-controller so that the CPU is resuspended or powered down by the micro-controller while the CD-ROM drive performs the command. In this way, power that would be otherwise wasted by the CPU executing unneeded instructions while the CD-ROM drive performs the command is, instead, conserved.

Figure 1:
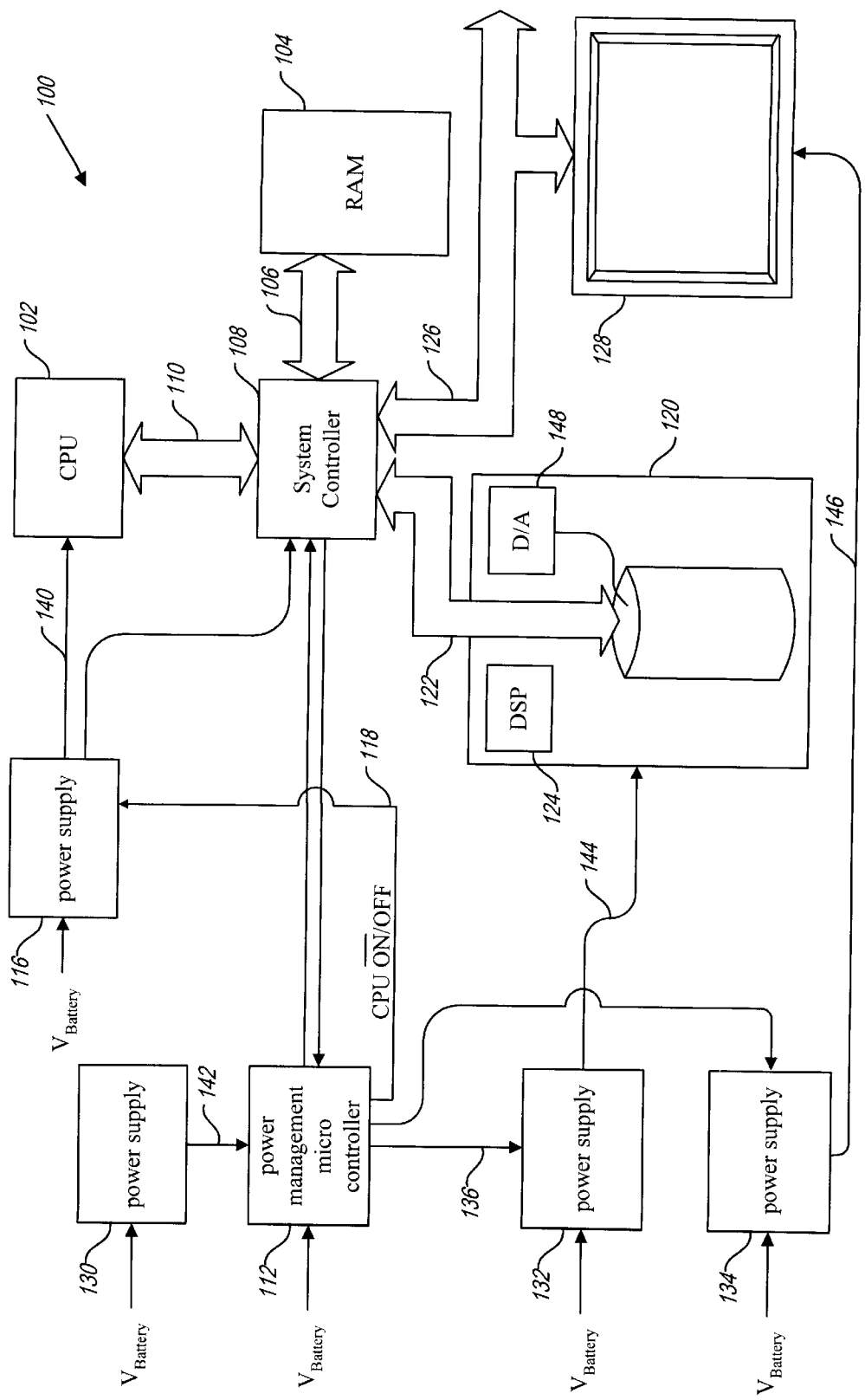
FIG. 1 is a block diagram of a conventional power-conserving laptop computer.

FIG. 1 is a block diagram of the relevant components of a conventional power-conserving laptop computer 100. The computer 100 includes a CPU 102 executing instructions that compose software application programs, operating system routines, and low-level device driver routines that control the operation of peripheral devices. The instructions that compose software routines are stored in a random access memory ("RAM") 104 and are fetched by the CPU 102 via a memory bus 106, a system controller 108, and a CPU bus 110. A power management micro-controller 112 is responsible for powering up and powering down the CPU 102, the system controller 108, and other electronic components so that the power-conserving laptop computer 100 is responsive to user input, but does not idly waste valuable electrical energy stored in batteries connected to the laptop computer by maintaining unused electronic components in a powered-on state. The power management micro-controller 112 is connected to the system controller 108 via a two-wire, bi-directional SM bus 114 that allows the power management micro-controller 112 to transmit and receive information to and from the CPU 102 via the system controller 108. The power management micro-controller 112 is additionally connected, via connection 118, to a power supply 116 that provides electrical power to both the CPU 102 and system controller 108. When the power management micro-controller 112 asserts the CPU ON/OFF output signal low through the connection 118, the power supply 116 provides power to the CPU 102.

A CD-ROM drive 120 is connected to the system controller 108 through a bus 122. The CD-ROM drive 120 contains a digital signal processor ("DSP") 124 that converts photoelectronic data read from a CD rotating within the CD-ROM drive 120 to digital data communicated to the system controller over the bus 122. The CD-ROM drive 120 additionally contains a digital-to-analog converter 148 that produces an analog signal from an audio CD that can be amplified and broadcast through loud speakers (not shown) attached to the laptop computer 100. The system controller 108 may also be connected to additional peripheral devices (not shown) by another bus 126, or, alternatively, through the bus 122 that interconnects the system controller 108 and the CD-ROM drive 120. A display screen 128 is connected to the system controller 108 by a bus 126.

The power management micro-controller 112 is supplied with electrical power through a separate power supply 130. The CD-ROM drive 120 is supplied with electrical power from a power supply 132, and the display screen 128 is supplied with electrical power from a power supply 134. The power management micro-controller 112 is connected to the power supplies 132 and 134 through signal lines 136 and 138, respectively. The power supplies 116, 130, 132, and 134 provide power to the CPU 102, the power management micro-controller 112, the CD-ROM drive 120, and the display screen 128 via connections 140, 142, 144, and 146, respectively. Alternatively, the four separate power supplies 116, 130, 132, and 134 shown in FIG. 1 could be replaced by a single power supply with switched outputs.

In the conventional power-conserving laptop computer 100 diagrammed in FIG. 1, low-level software routines that control the laptop computer 100 when it is powered-on can determine when the CPU 102 has been idle for a certain period of time and cause the CPU 102 to issue a power-CPU-down command to the power management micro-controller 112 via the CPU bus 110 and the SM bus 114. The power management micro-controller 112 then powers down the CPU 102, the system controller 108, and other temporarily unneeded electronic components in order to conserve electrical energy. In similar fashion, the display screen 128 can be powered down by the power management micro-controller 112 when the low-level software routines determine that what is being displayed on the display screen have not changed for some period of time.

Software application programs have been developed to allow a user to play back recorded music from an audio CD using the CD-ROM drive. A user may invoke such a program and, by some input or combination of inputs via a keyboard, a mouse, and a graphical user interface displayed on the display screen, direct the program to play an audio CD. From a power conservation standpoint, it would be desirable to immediately power down the CPU 102 once the CD-ROM drive 120 begins playing back the recorded music. Once the CPU 102 has issued a start-playing command to the CD-ROM drive 120 in response to user input, the CPU 102 is no longer needed until the user inputs an additional playback command. Furthermore, it would be desirable for the computer user to initiate playback of an audio CD through some means other than invoking a software application program and inputting commands through a graphical user interface displayed on the display screen. If it were possible for a user to issue playback commands more directly to the CD-ROM drive 120, power would be conserved because most of the electronic components of the laptop computer 100 would not need to be powered-on. The CPU 102 and system controller 108 would need to be powered-on only for a brief period of time preceding transmission of a command from the CPU 102 to the CD-ROM drive 120 in response to a user-input playback command. Conventional power-saving laptop computers 100 may eventually detect that neither the CPU 102 nor the display screen 128 are required after some period following initiation of a playback command, but a great deal of power is consumed in the interim, and, in the case of the display screen 128, power-up could be avoided completely if a graphical user interface were not required.

Figure 2:
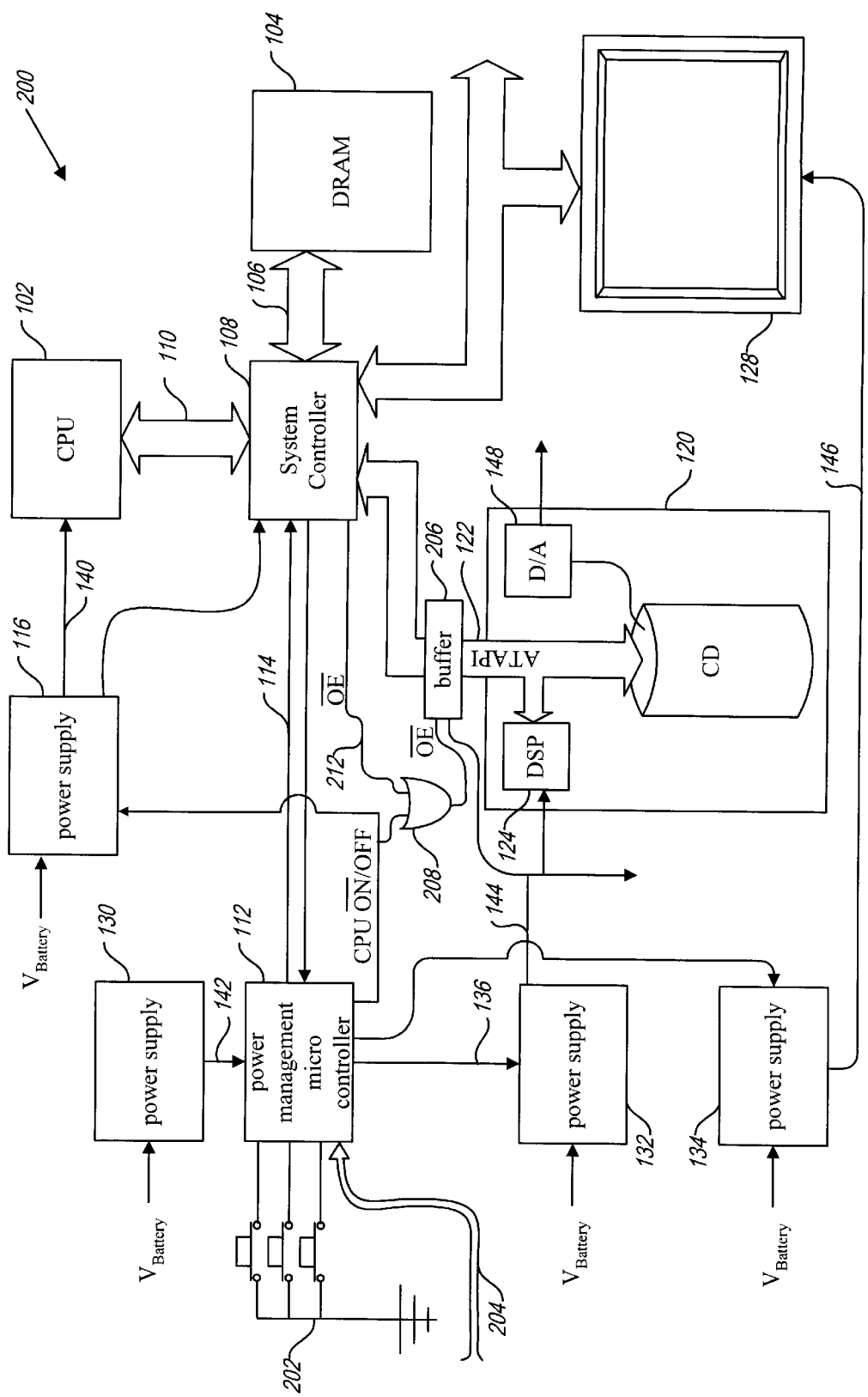
FIG. 2 is a block diagram of a power-conserving laptop computer in accordance with one embodiment of the invention.

FIG. 2 is a block diagram of a power-conserving laptop computer 200 in accordance with one embodiment of the invention. The majority of the components shown in FIG. 2 are identical to the components shown in FIG. 1. Thus, in the interest of brevity, those components of FIG. 2 that are identical to components in FIG. 1 have been provided with the same reference numerals as in FIG. 1, and an explanation of their operation will not be repeated.

Several additional components have been added to the computer 200 shown in FIG. 2. These include electro-mechanical pushbutton switches 202 that allow a computer user to activate the CD-ROM drive 120 in order to control playback of an audio CD, similar to the PLAY, STOP, and SKIP pushbuttons on conventional audio CD players. Additional inputs 204, including an input for volume control, have also been added. Inputs 202 and 204 are connected to the power management micro-controller 112. The bus 122 connecting the CD-ROM drive 120 with the system controller 108 is, in this embodiment, an AT Attach Packet Interface bus, and a quickswitch buffer 206 has been added to prevent current leakage from the CD-ROM drive 120 to the system controller 108 when the CD-ROM drive 120 is operating and the system controller 108 is not powered-up. An OR gate 208 has been added to control the buffer 206. When the CPU $\overline{\text{ON}}$/OFF output 118 from the power management micro-controller 112 is asserted low causing the CPU 102 to be powered-on, and when the $\overline{\text{OE}}$ output 212 of the system controller 108 is asserted low, then the $\overline{\text{OE}}$ input 214 to the quickswitch buffer 206 is also asserted low and data can flow between the CD-ROM drive 118 and the system controller 108. Otherwise, the $\overline{\text{OE}}$ input 214 to the quickswitch buffer 206 is deasserted high and the system controller is isolated from the CD-ROM drive.

When a user activates one of the input devices 202 or 204, the power management micro-controller 112 communicates the user's input via the system controller 108 to the CPU 102, which then transmits an appropriate command to the CD-ROM drive 120. If the CPU 102 has been powered down, then the power management micro-controller 112 first powers on the CPU 102 which then receives the user's input to an input device 202 or 204 from the power management micro-controller 112, transmits an appropriate command to the CD-ROM drive 120, and then requests that the power management micro-controller 112 power down the CPU 102 in order to conserve energy. The input devices 202 and 204 are sufficient to allow the user to control playback of an audio CD in the same manner that playback of an audio CD is controlled on a conventional CD player. The display screen 128 need not be in a powered-on state for playback of an audio CD. Thus, the battery power supply is conserved by not powering idle operation of the CPU 102 and display screen 128 while the CD-ROM drive 120 plays an audio CD. Unlike in the conventional system shown in FIG. 1, in this embodiment of the present invention, the CPU 102 is powered-on only for the amount of time required to receive an input from the user through an input device 202 or 204 and transmit an appropriate command to the CD-ROM drive 120.

Thus, in the power-conserving laptop computer embodiment shown in FIG. 2, the added electro-mechanical input switches 202 and 204 provide for user input directly to the CD-ROM drive 120 without the need for a software application program running on the CPU 102 or a graphical user interface displayed on the display screen 128. The added logic circuit provides for isolation of the system controller 108 from the CD-ROM drive 120 when the CD-ROM drive 120 is operating to play an audio CD and the CPU 102 is powered down or suspended to conserve electrical energy stored in the laptop computer's battery (not shown). A third difference between the embodiment shown in FIG. 2 and the conventional laptop computer shown in FIG. 1 resides in the BIOS power-up/reset routine initially stored, in both systems, in read-only memory and transferred to the RAM 104 for execution by the CPU 102.

Figure 3:
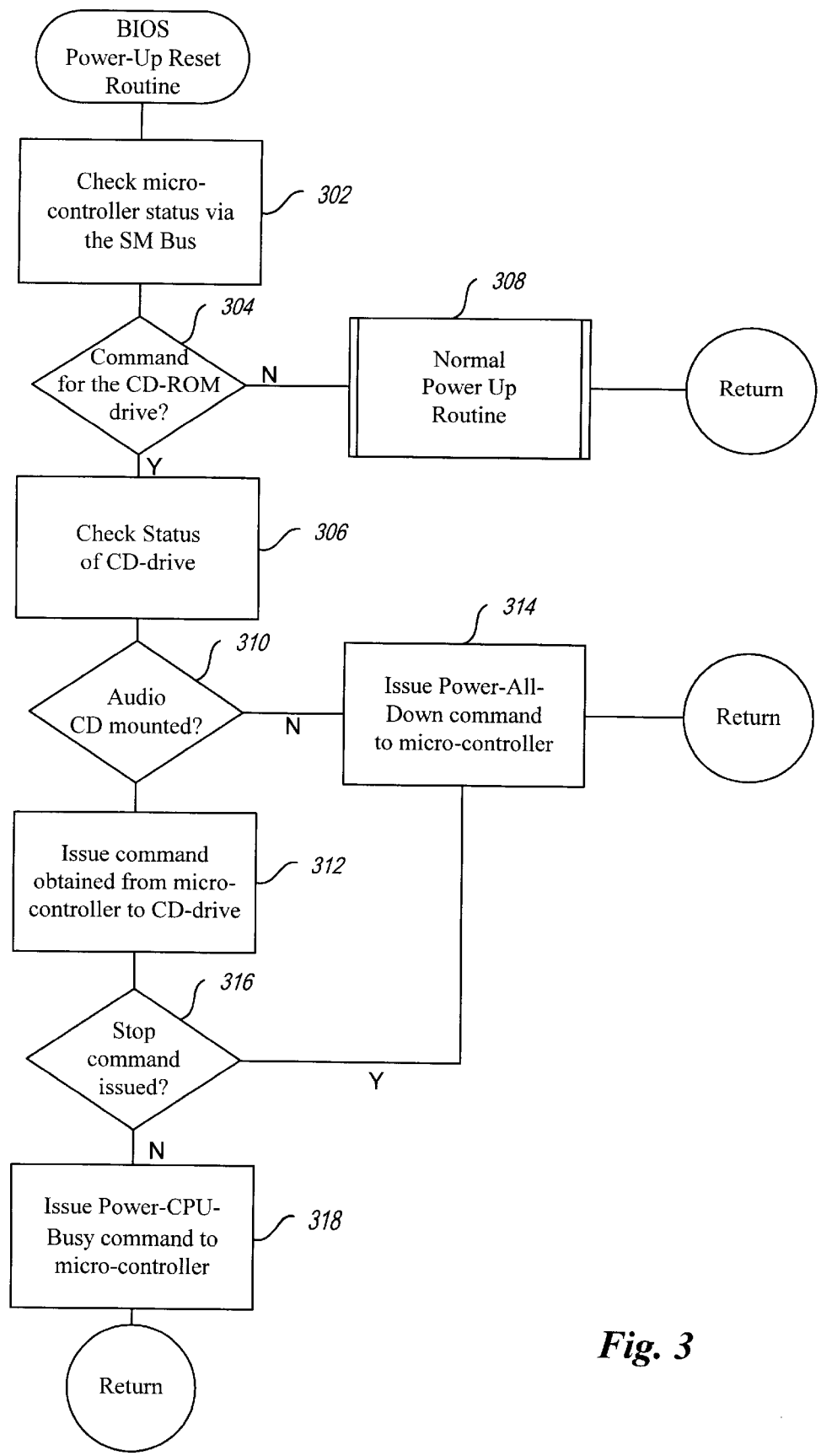
FIG. 3 is a flow control diagram of a BIOS power-up/reset routine modified to implement the embodiment shown in FIG. 2.

FIG. 3 is a flow control diagram of a BIOS power-up/reset routine modified to implement the embodiment shown in FIG. 2. The BIOS power-up/reset routine is invoked when the CPU 102 is reset or powered-on by the power management micro-controller 112. In step 301, the BIOS power-up/reset routine checks the status of the electro-mechanical input devices 202 and 204 as reported by the power management micro-controller 112 over the SM bus 114. If the BIOS power-up/reset routine determines, in step 304, that a user has input a playback command through input devices 202 or 204, control flows to step 306. If the user has not input a playback command through input devices 202 and 204, the BIOS power-up routine calls the conventional, or normal, power-up/reset routine in step 308 and then returns. If a playback command has been input by a user, then, in step 306, the BIOS power-up/reset routine checks the status of the CD-ROM drive 120 by sending a command to the CD-ROM drive 120 and receiving a response from the CD-ROM drive via the ATAPI bus 122, system controller 108, and the CPU bus 110. If the BIOS power-up/reset routine determines, in step 310, that an audio CD has been mounted in the CD-ROM drive, control flows to step 312. If the CD-ROM drive does not contain an audio CD, then, in step 314, the BIOS power-up/reset routine issues a Power-All-Down command to the micro-controller and then returns. The Power-All-Down command causes the power management micro-controller 112 to power down any of the electrical components of the laptop computer 200 that are in the powered-up state, other than the CD-ROM drive 120 and components required to playback an audio CD. This is done because only audio CDs can be played via the input controls 202 and 204. Otherwise, if a digital data-containing CD is mounted in the CD-ROM drive 120, then that data must be accessed under control of the CPU 102 running operating system device driver routines. If an audio CD is mounted in the CD-ROM drive 120, then in step 312, the BIOS power-up/reset routine determines the appropriate command to issue to the CD-ROM drive in order to cause the CD-ROM drive to perform the operation designated by the user as input to the input devices 202 and 204. If the BIOS power-up/reset routine detects, in step 316, that the command issued in 312 corresponds to a STOP command, then, in step 318, the BIOS power-up routine issues a Power-CPU-Down command to the power management micro-controller 112 so that the CPU 102, the system controller 108, and other temporarily unnecessary components are immediately powered down and precious electrical energy is not used to maintain the CPU in an idle running state, after which the BIOS power-up/reset routine returns.

Although the present invention has been described in terms of one embodiment, it is not intended that the invention be limited to this embodiment. Modification within the spirit of the invention will be apparent to those skilled in the art. For example, the power management micro-controller 112, shown as a separate electronic component in FIGS. 1 and 2, may instead be incorporated into the system controller 108 or some other integrated circuit within the computer. Different types of buses may be used, and a variety of different connectivity topologies may be employed to produce an embodiment of the present invention. A different type of input system, other than electro-mechanical push-button switches, may be used to provide the user with the ability to directly control the CD-ROM drive. Other types of peripheral devices might be similarly included in the laptop computer, similarly directly interfaced, similarly isolated with a buffer, and similarly controlled through the power management micro-controller, system controller, and CPU. Different types of power management strategies may be accommodated. For example, the power management system may be able to anticipate the probable timing of subsequent events requiring the CPU to be powered-up and therefore place the CPU in a ready state at precisely the time the CPU is needed to perform further operations. The present invention may be employed in computer systems other than laptop computers, and may be employed for purposes other than power conversation. The scope of the present invention is defined by the claims that follow.

What is claimed is:

1. A computer system comprising the following components:
   a peripheral device;
   a user input device for inputting a user-level command to operate the peripheral device; and
   a CPU that may operate in either a powered-up mode or a powered-down mode, and, when in the powered-down mode, is constructed to receive the user-level command from the user input device, respond to the user-level command by exiting the powered-down mode and operating in the powered-up mode, and, when in the powered-up mode, is constructed to transmit a peripheral device command corresponding to the received user-level command to the peripheral device, and, after the peripheral device receives the peripheral device command, to exit the powered-up mode and operate in the powered-down mode while the peripheral device executes the peripheral device command.

2. The computer system of claim 1, further comprising a power management device that detects when a component of the computer system is not needed to carry out current operations and powers the unneeded component down to conserve power.

3. The computer system of claim 1 wherein the user input device includes an electromechanical switch.

4. The computer system of claim 2, further comprising a system controller through which the CPU transmits the peripheral device command to the peripheral device, the system controller electronically isolated in response to a signal from the power management device while the peripheral device executes the peripheral device command.

5. A computer system that can be used to play an audio CD comprising the following components:
   a CD-ROM drive;
   a user input device for inputting a user-level command to play an audio CD that may be in the CD-ROM drive; and
   a CPU that may operate in either a suspend mode or an active mode, and, when in the suspend mode, is constructed to receive the user-level command from the user input device, respond to the user-level command by switching to the active mode, and, when in the active mode, transmiting a CD-ROM command corresponding to the received user-level command to the CD-ROM drive, and, after the CD-ROM drive receives the CD-ROM command, switching to the suspend mode while the CD-ROM executes the CD-ROM command.

6. The computer system of claim 5, further comprising a power management device that detects when a component of the computer system is not needed to carry out current operations and powers the unneeded component down to conserve power.

7. The computer system of claim 5 wherein the user input device comprises a number of electromechanical switches.

8. The computer system of claim 6, further comprising a system controller through which the CPU transmits the CD-ROM command to the CD-ROM drive, the system controller electronically isolated in response to a signal from the power management device while the CD-ROM drive executes the CD-ROM command.

9. A power-conserving computer system comprising the following components:
   an autonomous peripheral device that can execute a received peripheral device command without receiving further commands or control signals;
   a dependent peripheral device that requires further commands or control signals in order to execute a received peripheral device command;
   a user input device for inputting a user-level command to operate the autonomous peripheral device; and
   a CPU constructed so that, when powered down, it is powered up responsive to the user-level command from the user input device, and, in response to the user-level command and if the user-level command is directed to the autonomous peripheral device, it transmits a peripheral device command corresponding to the received user-level command to the peripheral device, and, after the peripheral device receives the peripheral device command, is powered down.

10. The power-conserving computer system of claim 9 wherein, when the CPU is powered up, the CPU receives the user-level command from the user input device and transmits a peripheral device command corresponding to the received user-level command to the autonomous peripheral device.

11. The power-conserving computer system of claim 9, further comprising speakers wherein the peripheral device is a CD-ROM drive that is operated to play an audio CD through the speakers.

12. The power-conserving computer system of claim 9 wherein the user input device is an electromechanical switch.

13. The power-conserving computer system of claim 10 further including a power management device that detects unused components and powers the unused components down to conserve power, the power management device powering down the CPU after the CPU is powered up to receive the user-level command from the user input device and after the CPU transmits a peripheral device command corresponding to the received user-level command to the autonomous peripheral device.

14. The power-conserving computer system of claim 13 further including a system controller through which the CPU transmits the peripheral device command to the autonomous peripheral device, the system controller electronically isolated from the autonomous peripheral device when the CPU is powered down and the autonomous peripheral device is executing a peripheral device command.

15. The power-conserving computer system of claim 14, further comprising loudspeakers wherein the peripheral device is a CD-ROM drive that is operated to play an audio CD through the loudspeakers.

16. A power-conserving computer system comprising the following components:
   a peripheral device that can execute a received peripheral device command without receiving further commands or control signals;
   a user input device for inputting a user-level command to operate the peripheral device;
   a CPU constructed so that, when powered down, it is powered up responsive to receiving the user-level command from the user input device, and, in response to the user-level command, it executes an initialization routine, the initialization routine selecting a peripheral device command corresponding to the user-level command, causing the user-level command to be transmitted to the peripheral device, and issuing a command to a power management device requesting that the CPU be powered down;

a power management device that detects unused components and powers the unused components down to conserve power, the power management device powering down the CPU responsive to the command from the CPU requesting that the CPU be powered down; and a system controller through which the CPU transmits the peripheral device command to the peripheral device, the system controller electronically isolated from the peripheral device when the CPU is powered down and the peripheral device is executing a peripheral device command.

17. The power-conserving computer system of claim 16 wherein the user input device is an electromechanical switch.

18. A power-conserving computer system comprising the following components:

a peripheral device that can execute a received peripheral device command without receiving further commands or control signals;

a user input device for inputting a user-level command to operate the peripheral device; and a CPU constructed so that, when powered down, it is powered up responsive to the user-level command from the user input device, and, in response to the user-level command, it executes an initialization routine, the initialization routine selecting a peripheral device command corresponding to the user-level command, causing the user-level command to be transmitted to the peripheral device, and issuing a command requesting that the CPU be powered down.

19. The power-conserving computer system of claim 18 wherein the user input device is an electromechanical switch.

20. A power-conserving computer system that can be used to play an audio CD comprising the following components:

a CD-ROM drive that produces an electrical signal when the audio CD is played;

one or more speakers that generate sound waves from the electrical signal produced by the CD-ROM drive;

a user input device for inputting a user-level audio CD command;

a power management device that detects when a component is not used and powers the unused component down to conserve power and that, upon receiving a command to power down a component, powers down that component; and a CPU that, when in an initially powered-down state, is powered up by the power management device responsive to the user-level audio CD command from the user input device, and, in response to the use-level audio CD command, causes the CPU to execute.

21. The power-conserving computer system of claim 20, further including a system controller through which the CPU transmits the selected CD-ROM command to the CD-ROM drive, the system controller electronically isolated from the CD-ROM in response to a signal generated by the power management device when the CD-ROM drive is executing a CD-ROM command and the power management device has powered down the CPU.

22. The power-conserving computer system of claim 20 wherein the user input device comprises the following electromechanical switches for controlling play of the audio CD:

a play switch for initiating play of the audio CD; and a stop switch for stopping play of the audio CD.

23. The power-conserving computer system of claim 20 wherein the user input device is an electromechanical switch.

24. The power-conserving computer system of claim 22 wherein the user input device further comprises the following electromechanical switches for controlling play of the audio CD:

a pause switch for pausing play of the audio CD;

a skip forward switch for skipping forward and initiating play from a new location on the audio CD; and a skip backward switch for skipping backward and initiating play from a new location on the audio CD.

25. The power-conserving computer system of claim 24, further comprising a volume control for controlling the volume of sound played from the audio CD.

* * * * *